United States Patent
Claude et al.

[11] Patent Number: 6,000,796
[45] Date of Patent: Dec. 14, 1999

[54] SLIDABLY RESILIENT HINGE FOR EYEGLASS FRAMES

[75] Inventors: Moenne Claude, Arenthon, France; Serafini Luciano, Geneva, Switzerland; Gerbet Andrë, Champagnole, France

[73] Assignee: LN Industries SA, Geneva, Switzerland

[21] Appl. No.: 09/014,268

[22] Filed: Jan. 27, 1998

[30] Foreign Application Priority Data

Jan. 29, 1997 [CH] Switzerland ................ 183/97

[51] Int. Cl.⁶ ...................................... G02C 5/22
[52] U.S. Cl. .............................. 351/153; 16/228
[58] Field of Search .................. 351/153, 111, 351/113, 114, 119, 121; 16/228

[56] References Cited

U.S. PATENT DOCUMENTS 2,550,348  4/1951  Hansen ......................... 16/228

FOREIGN PATENT DOCUMENTS

| | | |
|---|---|---|
| 0 003 001 | 7/1979 | European Pat. Off. . |
| 0 399 875 | 11/1990 | European Pat. Off. . |
| 0 628 846 | 12/1994 | European Pat. Off. . |
| 0 632 306 | 1/1995 | European Pat. Off. . |
| 2 428 859 | 1/1980 | France . |
| 2 609 816 | 7/1988 | France . |

*Primary Examiner*—Huy Mai
*Attorney, Agent, or Firm*—Young & Thompson

[57] ABSTRACT

The resilient hinge includes a first hinge (1) integral with the face part (2) of the frame of glasses, hinged by means of a screw (3) to a second knuckle (4) connected to a side piece (5) by means of a resilient device (6) with a spring. The latter biases resiliently al front part (12) of the branch (5) against cams (20, 21) integral with the first knuckle (1) and defining two stop positions for the side piece (5). A small plate (32), made of a low-friction material and having a shape bent at a right angle, is placed between the front part (12) and the cams (20, 21). This construction makes it possible to prevent the hinge from blocking, to reduce the friction between the movable parts of the hinge, to increase the bearing surface of the cams and increase the mechanical strength and the durability of the hinge.

12 Claims, 1 Drawing Sheet

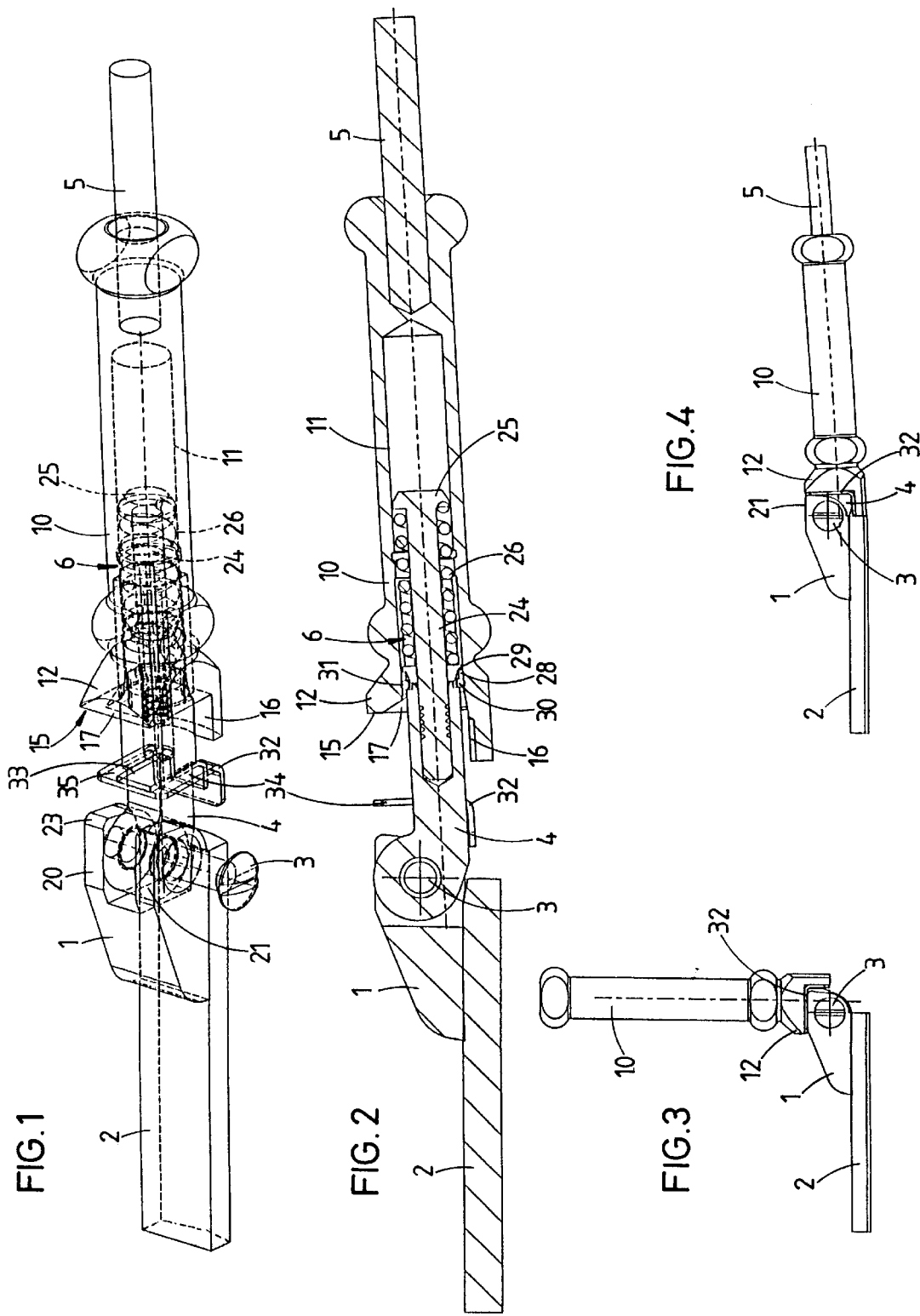

SLIDABLY RESILIENT HINGE FOR EYEGLASS FRAMES

BACKGROUND OF THE INVENTION

The present invention is concerned with a resilient hinge for a frame for eyeglasses comprising two knuckles, of which the first one is designed for being fastened to the front part of the frame and of which the second one is designed for being connected to a side piece by means of a resilient device, this device having a hollow into which is mounted slidably an extension of the second knuckle, which extension is subjected to the action of a spring, in such a manner as to bias resiliently a front part of the hollow against at least one part of the first knuckle, acting as a cam, to define stop positions for the side piece.

A hinge of this type is described in document FR 2609816. Considering the fact that in this type of hinge, the front part of the housing for the spring is biased against the other knuckle with a considerable force, both the knuckle and the housing are frequently damaged, in particular, when the frame is made of a material which is fragile, which tends to block, which is easily deteriorated by compression or which has a low resistance to friction, as it is the case, for example, of frames made of titanium or of titanium alloys.

SUMMARY OF THE INVENTION

The purpose of the present invention is to remedy to the abovementioned drawbacks and, to this end, is characterized in that the hinge comprises a small plate made of a low-friction material, wrapped around said extension and placed between said front part and the part acting as a cam.

By virtue of these characteristics, a hinge is obtained which provides both mechanical strength and durability, and which functions precisely, easily, smoothly and without blocking. The drawbacks associated with the use of frames made from material which are fragile and cause blocking, such as titanium, can thus be totally overcome.

Furthermore, in the case of a premature wear, the small plate could easily be changed, to restore proper functioning of the hinge, at a low cost.

Favourably, said front part has two surfaces which are substantially orthogonal, a first one being substantially perpendicular to the side piece and the second one being substantially parallel to the side piece and to the axis of the hinge and said small plate being provided as a piece having a substantially right angle, so that it may be applied against the two orthogonal surfaces of the front part.

An excellent protection is thus obtained for the moving parts of the hinge in the different stop positions and in all the intermediate positions, as well as a particularly smooth operation.

A preferred embodiment is characterized in that said spring is a helical spring surrounding the extension which has a width lesser than the inner diameter of the spring, the first surface of the front part of the hollow having an opening of a width equal or greater than the outer diameter of the helical spring, in such a manner that the latter may be introduced into the hollow through this front part and retained in the hollow by blocking means and in that said small plate has a central opening of a width lesser than the width of the opening of the hollow, so that the small plate provides for the part or the parts, acting as a cam, of the first knuckle, a bearing surface having an area which is greater than that of said first surface.

In known hinges, the front surface of the housing designed for cooperating with the cam has a lateral width which is considerably reduced owing to the relatively large introduction bore provided for the spring. At these locations, the known hinges are even more rapidly worn and deteriorated, with the result that, owing to their blocking, the hinges perform poorly and become eventually inoperative. Owing to the above-mentioned characteristics, the bearing surface of the moving parts in contact is increased significantly and made resistant. Accordingly, the hinge has increased strength and durability, an improved stability and operates more smoothly, without blocking.

Advantageously, the small plate is made of two strips of a width substantially equal to that of the parts, acting as a cam, of the first knuckle, these two strips providing slides and being connected together at their upper and lower ends.

These characteristics make it possible to operate the hinge very accurately.

Advantageously, the small plate will be made of nickel silver, bronze, stainless steel, galvanically treated steel, a low-friction polymer or of a material having undergone a surface treatment.

Other advantages will become apparent from the characteristics set forth in the dependent claims and from the detailed description made hereafter of the invention, with reference to drawings, which illustrate an embodiment, schematically and by way of example.

BRIEF DESCRIPTION OF THE DRAWINGS

FIG. 1 is a schematic exploded perspective view of this embodiment.

FIG. 2 shows this embodiment in longitudinal cross-section.

FIGS. 3 and 4 illustrate this embodiment in a folded and in an open position.

The resilient hinge illustrated in the drawings includes a first knuckle 1 integral with the face part 2 of a frame for glasses, pivotally mounted by means of a screw 3, to a second knuckle 4 connected to a side piece 5 of the glasses, via a resilient spring device 6.

This device includes a housing 10, which is integral with the side piece 5 or which is integral with this hinge. This housing has a hollow 11 extending longitudinally relative to the side piece 5. This hollow 11 includes a front part 12 with two surfaces 15, 16, which are substantially orthogonal. A first one of these surfaces, 15, is substantially perpendicular to the axis of the side piece 5, whereas the second one, 16, runs parallel to the axes of the side piece and of the hinge.

The first surface 15 has an opening 17 communicating with the hollow 11. The first knuckle 1 ends by two legs 20, 21, of which the periphery provides the cam profiles 23. The second knuckle 4 is mounted pivotally between these two legs and is integral with a rod-shaped extension 24 having a head 25 at its end. This rod 24 carries a helical spring 26 of which the inner diameter is greater than the outer diameter of the rod 24. The rod—spring assembly can be introduced by a longitudinal sliding motion through the opening 17, into the hollow 11, since the external diameter of the spring is lesser than the diameter of the opening 17. The blocking member 28 includes a ring abutment 29 and a split ring 30 designed for cooperating resiliently with a circular groove 31 of the hollow 11. This member 28 is introduced by sliding into the hollow 11 and fastened to its inner wall to provide an abutment for a first end of the spring 26, whereas the second end of this spring 26 is supported by the head 25 of the rod 24. Thus, the spring 26, biases the front part 12 of the hollow 11 in the direction of the legs 20, 21 of the first knuckle 1.

The hinge is provided with a small plate 32 made of a low-friction material and arranged around the rod 24 to be positioned between the front part 12 of the hollow 11 and the two legs 20, 21 of the first knuckle 1. This small plate 32 is folded at a substantially right angle, so that it may be applied against the two surfaces 15, 16 of the front part 12. It has a central opening 33 of a width lesser than the diameter of the opening 17 of the hollow 11, so as to provide bearing surfaces for the two legs 21, 22, of a surface area greater than that of the surface 15. Thus, the small plate 32 is comprised of two strips 34, 35 providing slides for the legs 20, 21, having a width substantially equal to that of these legs 20, 21 and being connected at their upper and lower ends by cross pieces.

The small plate 32 is advantageously made of nickel silver, bronze, stainless steel, galvanically treated stainless steel, a low-friction polymer such as polytetrafluoroethylene or a material which had undergone a surface treatment under vacuum, for example with $MOS_2$. Its constitution and its geometry make it possible to prevent any blocking of the hinge, to reduce the friction between the moving parts and the hinge and to increase the bearing surface for the cams 20, 21 of the hinge. A double-effect hinge is thus obtained. This small plate is particularly useful in the case of frames made of materials which are fragile, have a tendency to block, are damaged if compressed, lack mechanical strength and resistance, such as for examples frames made of titanium or of titanium alloys. In such cases, the small plate prevents damages to the hinge or a premature wear thereof.

The special shape of the small plate makes it possible to wrap effectively the active front surfaces 23 of the cams 20, 21, and this in all positions, including the two stop positions, i. e. the fully folded position and the fully open position, illustrated in FIGS. 3 and 4.

Clearly, the embodiment described above is not limiting and can receive all sorts of desirable modifications within the scope of the invention as set forth in claim 1. In particular, the small plate may have a different shape adapted to the surfaces which it is designed to protect, while being conformed so that it may be applied either on said front part 12 of the housing, or on the part 20, 21, acting as a cam, of the first knuckle 1, even if these parts have a shape other than that of the embodiment illustrated. The resilient device connecting the second knuckle to the side piece of the glasses could be of a different construction, for example have a spring of some other type. The first knuckle 1 could have a different number of legs and have otherwise shaped cam surfaces than those of the legs 20, 21, to provide, for example, a number of stop positions higher than two.

We claim:

1. A resilient hinge for a frame of eyeglasses, comprising first and second knuckles (1, 4), the first knuckle being fastened to a front part (2) of the frame and the second knuckle (4) being connected to a side piece (5) of the frame by means of a resilient sliding device (6) comprising a longitudinal chamber (10) integral with the side piece (5) and having a hollow (11) into which is slidably mounted an extension (24) of the second knuckle (4), said extension being urged by a spring (26) mounted in said longitudinal chamber and bearing against said longitudinal chamber and on said extension so as to resiliently bias a front part (12) of the longitudinal chamber (10) against a cam (20, 21) of the first knuckle (1) to define stop positions for the side piece (5), said hinge comprising a plate (32) made of a low-friction material surrounding said extension and interposed between said front part (12) of the longitudinal chamber (10) and said cam (20, 21) of the first knuckle.

2. A hinge according to claim 1, wherein said front part (12) of the longitudinal chamber (10) has first and second surfaces (15, 16) arranged to be substantially orthogonal to one another, the first surface (15) being substantially perpendicular to the side piece to and the second surface (16) being substantially parallel to the side piece (5) and to the axis of the hinge, said plate (32) being shaped in substantially a right angle so that said plate may be applied against the first and second surfaces (15, 16) of the front part (12).

3. A hinge according to claim 2, wherein said spring (26) is a helical spring surrounding the extension (24), said extension having a width which is less than an inner diameter of the spring (26), the first surface (15) of the front part (12) of the longitudinal chamber (10) having an opening (17) of a width at least equal to an outer diameter of the helical spring (26), so that the spring may be introduced into the hollow (11) through the front part (12) and retained in the hollow (11) by a blocking means (28), said plate (32) having a central opening (33) with a width less than the width of the opening (17) of the longitudinal chamber (10), so that the plate (32) provides for the cam (20, 21) of the first knuckle a bearing surface having an area which is greater than an area of said first surface (15).

4. A hinge according to claim 1, wherein the cam comprises two parts (20, 21) of the first knuckle and wherein the plate (32) comprises two strips (34, 35), said strips having widths substantially equal to widths of said two parts (20, 21), respectively, said two strips (34, 35) providing slidable surfaces and being connected together at upper and lower ends.

5. A hinge according to claim 1, wherein the plate (32) comprises at least one of nickel silver, bronze, stainless steel, galvanically treated steel, a low-friction polymer, and a material coated with low-friction material.

6. A resilient hinge for a frame of glasses, comprising first and second knuckles (1, 4), said first knuckle being fastened to a front part (2) of the frame, said second knuckle (4) being connected to a side piece (5) by means of a resilient sliding device (6), the first knuckle (1) comprising at least two cams (20, 21) arranged laterally of the second knuckle (4), said resilient sliding device (6) comprising a longitudinal chamber (10) integral with the side piece (5), said longitudinal chamber having a hollow (11) into which is slidably mounted an extension (24) of the second knuckle (4), said extension being urged by a spring (26) mounted in said longitudinal chamber and bearing against said longitudinal chamber and on said extension so as to resiliently bias a front part (12) of the longitudinal chamber (10) against said two cams (20, 21) of the first knuckle (1) to define rotational stop positions for the side piece (5), said hinge comprising a plate (32) made of a low-friction material surrounding said extension and interposed between said front part (12) of the longitudinal chamber (10) and said two cams (20, 21) of the first knuckle, said spring (26) being a helical spring surrounding the extension (24), the extension having a width lesser than an inner diameter of the spring (26), the front part (12) of the longitudinal chamber (10) having an opening (17) with a width at least to equal an outer diameter of the helical spring (26), in such a manner that the helical spring may be introduced into the hollow (11) through said front part (12) and retained in the hollow (11) by a blocking means (28), said plate (32) having a central opening (33) with a width less than the width of the opening (17) of the front part (12) so that the plate (32) provides for said two cams (20, 21) of the first knuckle a bearing surface having an area which is greater than a surface of said front part (12).

7. A resilient hinge for a frame of eyeglasses, comprising:

a first knuckle adapted for connection to a front part of the frame;

a second knuckle rotatably connected to the first knuckle, the second knuckle having an extension;

a housing adapted for connection to a side piece of the frame, the housing having a longitudinal hollow therein, the extension of the second knuckle being disposed within the longitudinal hollow;

a spring disposed within the longitudinal hollow, the spring bearing at a first end on the extension of the second knuckle, the spring bearing at a second end on the housing, so as to urge the housing toward the first knuckle, the housing being slidable away from the first knuckle against the urging of the spring; and a plate with an opening therein, the plate being disposed between the first knuckle and the housing, the plate being under a compression force due to the urging of the spring, the extension of the second knuckle passing through the opening in the plate.

8. The resilient hinge of claim 7, wherein the first knuckle further comprises a cam, the housing further comprising a front part, the plate being disposed between and in direct contact with the cam and the front part, the cam and front part being shaped so as to define rotational stop positions for the hinge.

9. The resilient hinge of claim 8, wherein the front part of said housing has first and second surfaces arranged substantially orthogonal with one another, the first surface being substantially perpendicular to the side piece, the second surface being substantially parallel to the side piece, the plate being shaped into substantially a right angle so as to fit against the first and second surfaces of the front part.

10. The resilient hinge of claim 9, wherein the spring is a helical spring which surrounds the extension of the second knuckle, the first surface of the front part having an aperture therein with a size sufficient to allow the spring to pass therethrough, the opening in the plate having a size smaller than the aperture in the first surface, and wherein the plate provides a bearing surface against the cam which is greater than a bearing surface of the first surface.

11. The resilient hinge of claim 10, wherein the cam comprises two parts of the first knuckle, the plate comprising two strips; a width of the two strips being substantially equal to a width of the two parts of the cam, respectively, the two strips being connected to one another at upper and lower ends thereof.

12. The resilient hinge of claim 11, wherein the plate comprises at least one of nickel, bronze, stainless steel, galvanically treated steel, and a low-friction polymer.

* * * * *

UNITED STATES PATENT AND TRADEMARK OFFICE
CERTIFICATE OF CORRECTION

PATENT NO. : 6,000,796
DATED      : December 14, 1999
INVENTOR(S): Claude MOENNE et al.

It is certified that error appears in the above-indentified patent and that said Letters Patent is hereby corrected as shown below:

On the title page, Item [75] Inventors:, rewrite as follows:

--Claude Moenne. Arenthon, France;

Luciano Serafini. Geneva, Switzerland;

André Gerbet. Champagnole, France--

Signed and Sealed this

Twenty-seventh Day of June, 2000

Attest:

Attesting Officer

Q. TODD DICKINSON

Director of Patents and Trademarks